United States Patent [19]

King

[11] Patent Number: 5,076,315

[45] Date of Patent: Dec. 31, 1991

[54] DISPERSAL VALVE AND CANISTER

[76] Inventor: Joseph A. King, 16261 S. Temple Dr., Minnetonka, Minn. 55343

[21] Appl. No.: 605,734

[22] Filed: Oct. 30, 1990

Related U.S. Application Data

[63] Continuation-in-part of Ser. No. 556,760, Jul. 23, 1990.

[51] Int. Cl.$^5$ .......................................... B01D 11/02
[52] U.S. Cl. ................................. 137/268; 422/264; 422/282
[58] Field of Search ............... 137/268; 422/281, 282, 422/264, 265

[56] References Cited

U.S. PATENT DOCUMENTS

| | | | |
|---|---|---|---|
| 3,792,979 | 2/1974 | Clinton | 137/268 UX |
| 3,828,983 | 8/1974 | Russo | 137/268 X |
| 3,846,078 | 11/1974 | Brett | 137/268 X |
| 4,250,911 | 2/1981 | Kratz | 137/268 |
| 4,662,387 | 5/1987 | King | 137/268 |
| 4,702,270 | 10/1987 | King | 137/268 |

*Primary Examiner*—Alan Cohan
*Attorney, Agent, or Firm*—Jacobson & Johnson

[57] ABSTRACT

A dispersal valve and canister with the dispersal valve resiliently supporting a loaded canister in the dispersal valve. The canister includes a visual indicator to permit a user to determine when the canister needs to be replaced with the canister having an air pocket for retaining at least a portion of the dispersant above the liquid with the canister including sides to funnel the unused dispersant into the trough to displace the dispersant in the liquid that is dispensed into the liquid so that the rate of dispersant of dispensing material into the liquid remains substantially constant during a substantial portion of the time the dispersal valve dispenses material into the liquid.

23 Claims, 12 Drawing Sheets

DISPERSAL VALVE AND CANISTER

CROSS REFERENCE TO RELATED APPLICATIONS

This application is a continuation-in-part of my patent application Ser. No. 556,760 filed July 23, 1990 titled Dispersal Valve and Canister.

FIELD OF THE INVENTION

This invention relates to dispersal valves and more specifically to improvements to dispersal valves and removable canisters for dispersal valves.

BACKGROUND OF THE INVENTION

A valve with a canister for dispersing materials into a liquid is shown in U.S. Pat. No. 4,662,387. Such dispersal valves are used to disperse a solid dispersant into a liquid. Typical applications are to disperse chlorine or bromine into a water supply to disinfect the water. In general, the prior art in line dispersal valve controls the rate of dispersant by controlling the amount of water flowing through a canister in the dispersal valve. The canister includes a removable top for inserting additional dispersant material in the canister. The present invention is an improvement to the dispersal valve shown in U.S. Pat. No. 4,662,387 by providing more precise control of the rate of dispersal over an extended period of time as well as providing a visual indication of when the dispersant in the canister is used up.

DESCRIPTION OF THE PRIOR ART

U.S. Pat. No. 4,731,036 shows an indicating means using a magnet to indicate the presence of metallic objects in the water.

U.S. Pat. No. 3,258,968 shows a liquid level indicating device that uses a magnetic switch and a float.

U.S. Pat. No. 4,552,090 showing a floatable follower with a magnet and a switch to indicate the position of the follower.

U.S. Pat. No. 4,763,685 shows a floating dispersal member that tips over when the dispersant is dissolved.

U.S. Pat. No. 3,915,340 shows an indicator for a dispensing device for a copier that uses a magnetic switch.

U.S. Pat. No. 885,675 shows a liquid level indicator that uses a magnet that rotates a second magnet on the outside of the container. A spiral groove in the side of the container and a float coact to causes the internal magnet to rotate the outside magnet to provide an indication of whether the container is full.

U.S. Pat. No. 4,208,376 shows an indicator that is mechanical pushed up to a visible state from a a recess.

U.S. Pat. No. 1,469,065 shows a sight glass to permit a user to observe and indicator in a fertilizer spreader.

U.S. Pat. No. 2,069,179 shows a pointer that follows the level of the liquid in the container.

Offenlegungsschrift 2210827 shows an indicator that with a pointer that moves in response to the weight on a spring.

U.S. Pat. No. 4,750,512 shows a fertilizer container with the rate of solution dependent on the the water flow.

U.S. Pat. No. 4,010,708 shows a an indicator for a helicopter blade.

U.S. Pat. No. 4,662,387 shows an inline dispersal valve with a keyed cannister to disperse material into a liquid.

BRIEF DESCRIPTION OF THE INVENTION

Briefly, the present invention comprise a dispersal valve and canister with the dispersal valve resiliently supporting a loaded canister in the dispersal valve. The canister includes a visual indicator to permit a user to determine when the canister needs to be replaced with the canister having an air pocket for retaining at least a portion of the dispersant above the liquid in the dispersal valve so that the amount of dispersant in contact with the liquid remains substantially constant during a substantial portion of the time the dispersal valve is dispersing material into the liquid.

BRIEF DESCRIPTION OF THE DRAWINGS

The present invention is described by reference to the drawings in which.

DESCRIPTION OF THE PREFERRED EMBODIMENT

Figures 1, 2:
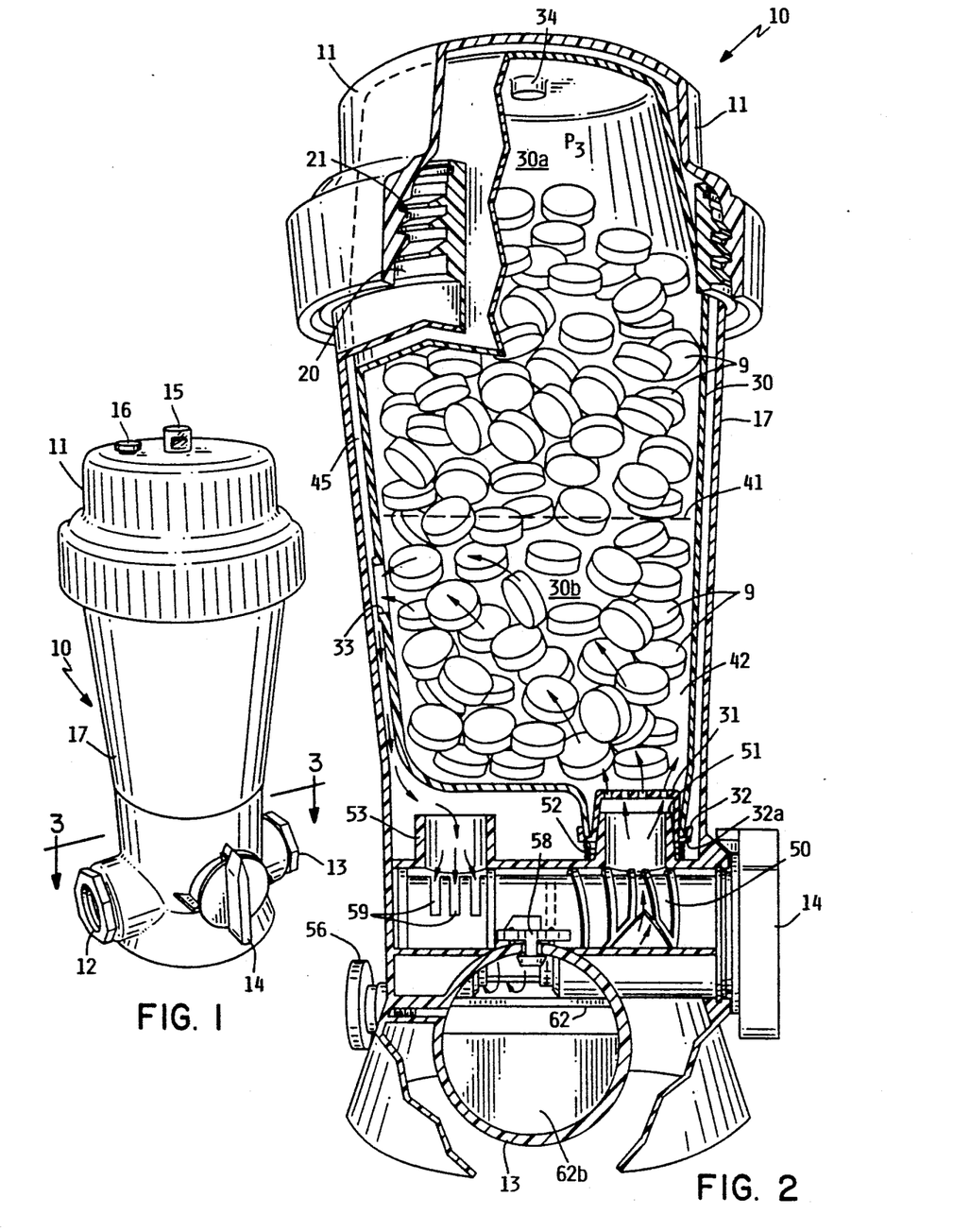
FIG. 1 is a pictorial view of a dispersal valve.
FIG. 2 is a partial cut-away view of the dispersal valve and canister.

Referring to FIG. 1 reference numeral 10 general identifies a dispersal valve for controllable dispersing a solid dispersant such as bromine or chlorine tablets into a liquid. Dispersal valve 10 includes a housing 17 having a removable cover 11 fastened thereto by threads or the like. Located on top of cover 11 is an air vent 16 that can be opened to bleed air from dispersal valve 10. Located on top center of cover 11 is a visual indicator means 15 comprising an outer transparent, hollow sight member that permits an observer to peer through the sight member to determine if any visual indication means is present in the sight member.

Dispersal valve 10 includes a fluid inlet 13 on one side of housing 17 and a fluid outlet 12 located on the opposite side of housing 17. A rotary plug 14 permits a user to control the amount of fluid that can be directed through the dispersal valve. An example of a dispersal valve with a rotatable plug for controllable directing fluid through the dispersal valve to disperse materials such as bromine and chlorine into swimming pools, hot tubs, spas, and the like is shown in greater detail in U.S. Pat. No. 4,662,387.

FIG. 2 shows a partial cross sectional view of a dispersal valve 10 containing a removable, buoyant canister 30 that is filled with solid disk shaped disperant tablets 9. Canister 30 is displaceable upward in response to the dispersing of solid dispersant tablets 9 in canister 30. The upward displacement of canister 30 is used to provide a visual indication that the dispersant in canister 30 has been depleted and that the empty canister 30 should be replaced with a full canister.

Dispersal valve 10 comprises an interior chamber 45 for holding removable canister 30. In order to permit removal of canister 30 from housing 17 there are provide threads 20 on housing 17 and threads 21 on cover 11. The thread connection between housing 17 and cover 11 permits the user to remove cover 11 and replace an empty canister with a full canister.

The lower portion of chamber 45 includes a fluid outlet port 51 extending upward into a fluid inlet cap 32 which is located in the bottom portion of canister 30. Fluid inlet cap 32 includes a grid work to support and prevent disperant tablets 9 from falling out of canister 30. A plurality of openings 31 in fluid cap 32 permits liquid 42 to circulate through and around dispersant tablets 9. Located around port 51 is a resilient member 52 comprising a compression spring that provides a normal upward force on an annular lip 32a of canister 30. FIG. 2 shows canister 30 filled with disperant tablets 9 with the weight of canister 30 and dispersant tablets 9 compressing spring 52 downward to hold the inlet cap 32 in fluid communication with outlet port 51.

Located on the side of canister 30 is a fluid outlet port 33 that permits liquid 42 entering canister 30 to be discharged to a fluid inlet port 53 located in the bottom of chamber 45. Reference numeral 41 generally identifies the interface between the air and the liquid 42 in dispersal valve 10. The arrows indicate the general flow of liquid through the interior of valve 10 and canister 30.

FIG. 2 shows that there are two distinct compartments in canister 30, a lower compartment 30b filled with liquid 42 and solid dispersant tablets 9 and an upper compartment 30a filled with a fluid such as air or a gas and additional dispersant tablets 9. The upper compartment comprises an air pocket where air remains trapped since there is no opening in the top portion of canister 30. FIG. 2 shows the dispersant valve with a full canister with the dispersant tablets 9 located in both lower compartment 30b and upper air pocket 30a. In the present invention the utilization of a canister that contains an air pocket prevents all of the liquid dissolvable dispersant tablets 9 from being in contact with liquid 42. Consequently, only those tablets 9 that are located in liquid 42 can be dissolved and carried away by liquid 42. As the tablets 9 dissolve in the liquid 42 the fresh, undissolved tablets in upper air compartment 30a fall into the liquid 42 in compartment 30b and begin to dissolve. Thus with the present invention and the utilization of an air compartment in the top of the canister, one prevents all of the tablets 9 from simultaneously dissolving or dispersing into liquid 42. By limiting the amount of tablets in contact with liquid 42 one can control the rate at which the tablets 9 disperse into liquid 42 since the dissolution rate of dispersant is directly proportional to the amount of dispersant tablets in contact with the liquid. Thus the present invention by providing an air chamber in the canister 30 can control the rate of dispersant by maintaining the same amount of dispersant tablets in the liquid even though the dispersant tablets are being continually dissolved. One can also disperse material at a lesser rate. For example if one wanted to use valve 10 to disperse dispersant at a much slower rate one would use a canister with an air pocket to limit the amount of liquid in contact with the dispersant tablets. An advantage of the present invention is that not only can the rate of dispersing be slowed down by using a canister with an air pocket but the rate of dispersant remains substantially constant while the dispersant tablets 9 are being dissolved and carried away by liquid 42 since the tablets that are dissolved are being continually being replaced by fresh tablets 9 that fall from upper compartment 30a into lower compartment 30b.

One of the benefits of the present invention with the use of an air pocket is that it has been found to limit the amount of gas in the canister that results from the dissolution of the solid dispersant. For example, if chlorine tablets are used one will limit the amount of chlorine gas that escapes from the system in comparison to dispersal valves that have open canisters since the canister and its air pocket limit the amount of space for chlorine gas in the dispersal valve. This advantage is particular true in applications where the dispersal valve is located at a lower level than the pool or spa. In these instances the water flows over the top of the canister as the system is shut down but it does not flow into the air pocket.

In normal dispensing operation of dispersal valve 10 liquid from valve inlet 13 enters canister 30 through passages 50 in rotary plug 14 and openings 31 in fluid cap 32. The liquid flows around the tablets 9 in the lower portion of canister 30 and out through the side opening 33. As the liquid flows around tablets 9 depending on the type of tablets the tablets will either dissolve or erode and be carried away by liquid 42. From canister outlet port 33 liquid flows through port 53 and openings 59 in rotary plug 14. Liquid 42 then flows back and into valve outlet port 12 to the pool, spa, or other liquid which requires treatment.

Figure 3:
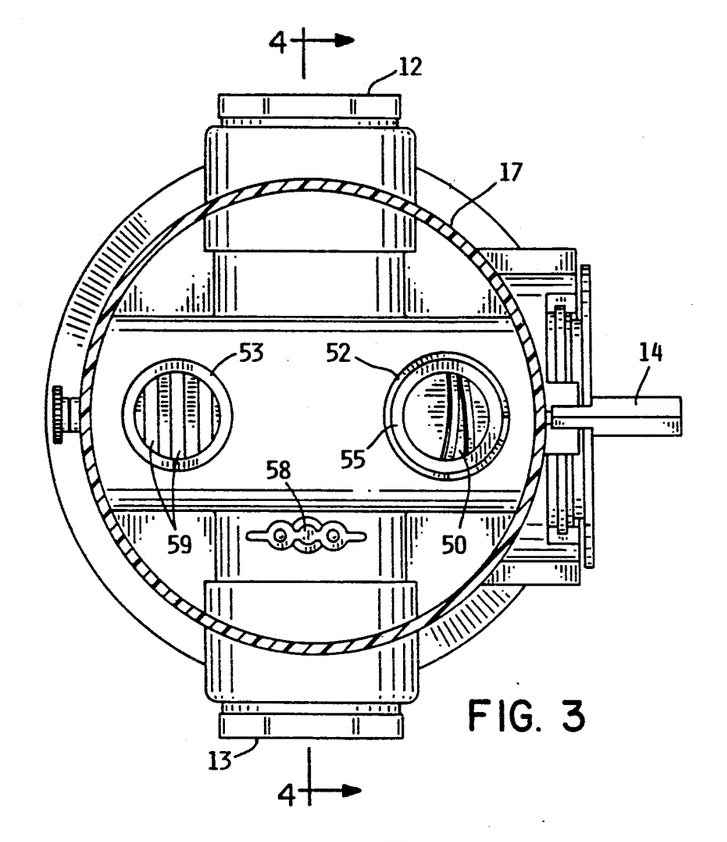
FIG. 3 is a top sectional view of the dispersal valve.

FIG. 3 shows a top sectional view of the lower portion of valve 10 showing the location of fluid port 55 with spring 52 extending around port 55. Although port 55 is shown as being circular, port 55 could be elliptical or other shape as long as port 55 matches up with the inlet port to canister 30 to thereby direct liquid 42 into canister 30 as the canister moves upward in chamber 45. The fluid port 53 shows openings 59 in plug 14 that permit liquid to flow back into the chambers located in the lower portion of valve 10. Similarly, the fluid port 55 shows openings 50 in plug 14 to permit liquid to enter canister 30.

Figure 4:
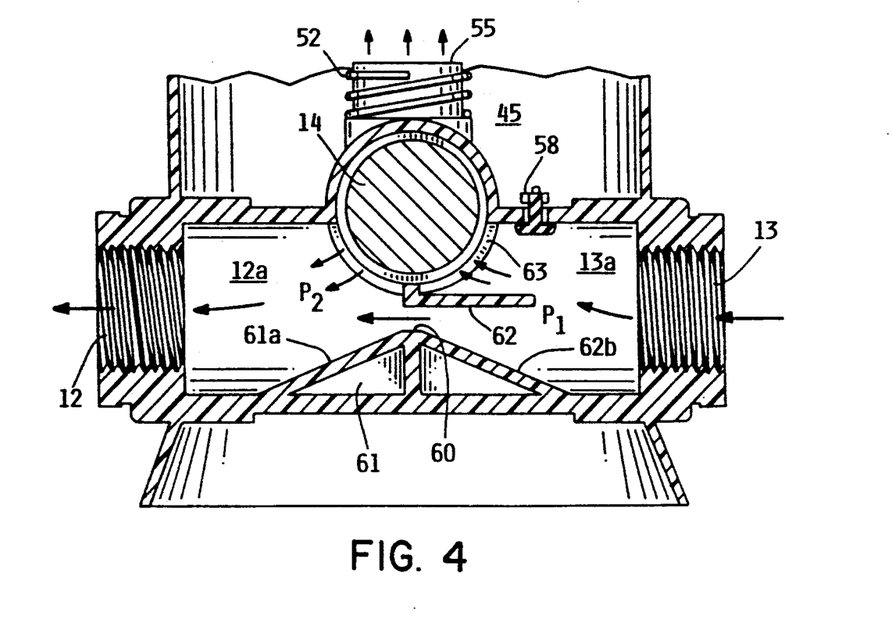
FIG. 4 is a partial sectional view of the bottom of the dispersal valve.
Figure 5:
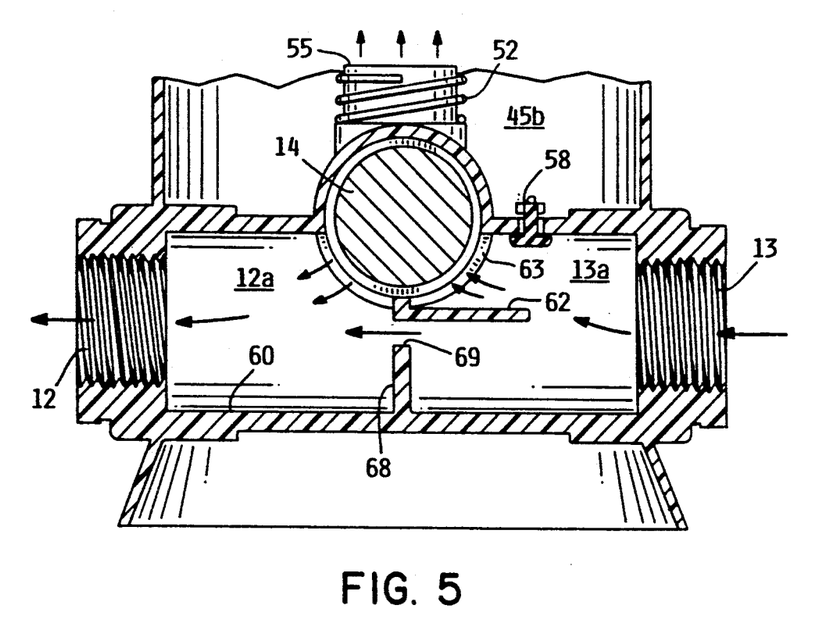
FIG. 5 is an alternate embodiment partial sectional view of the bottom of the dispersal valve.

FIG. 4 shows a side sectional view showing the diversion of a portion of the liquid to the canister and the relative direction of liquid flowing from inlet port 13 to outlet port 12. Located in the lower portion of valve 10 is a fluid outlet chamber 12a and a fluid inlet chamber 13a. Located on the bottom portion of valve 10 is a venturi ramp 61 having a first ramped surface 61a and a second ramped surface 62b that coacts with extension lip 62 to smoothly and gradually decrease the area for fluid to pass through opening 60. The purpose of venturi ramp 60 is to provide a smaller region or opening 60 for the liquid to flow through and consequently increase the velocity of the liquid while decreasing the local pressure on the fluid. It has been found that if a venturi ramp 61 is located at the bottom of valve 10 it generally renders the volume of the air in compartment 30a relatively insensitive to changes in downstream pressure located beyond the outlet port 12. Consequently, if the volume of the compressed air in canister 30 remains relatively constant even though the downstream pressure may vary, the level of liquid in the valve remains substantially constant and one can maintain substantially the same amount of tablets in contact with the liquid to thereby maintain a constant rate of dispersant from valve 10. FIG. 4 also shows a two way valve 58 that permits liquid in the upper portion of valve 10 to drain into the lower portion when the system is shut down. When the system is pressurized the opposite occurs since valve 58 seals lower chamber 13a from valve chamber 45. In operation of valve 10 a liquid such as water flows into chamber 13a with a portion of the liquid entering opening 63 and into plug 14 where it flows through port 55. A portion of the liquid continues on through chamber 13a by flowing under lip 62 where the velocity increases and the pressure decreases as the area decreases. As the fluid flows down ramp surface 61a the area increases and the velocity decreases as the liquid discharges from the discharge side of plug 14. It should be understood that in most applications the downstream pressure remains relatively constant, however in those applications where there may be substantial variation a restricter such as a venturi 61 in valve 10 may be used FIG. 5 shows an alternate embodiment of a dispersal valve where the venturi ramp 61 has been replaced by an upward extending weir 68 that also restricts the area for fluid as it flows from chamber 13a to chamber 12a. In either case the fluid velocity is increased by the decreasing of cross sectional area thereby increasing the velocity of the fluid flowing through the lower portion of valve 10. In both embodiments the use of a weir or a venturi ramp the effect is to render the pressure $P_3$ in the interior of valve 10 and the volume of the air in compartment 30a less sensitive to changes in pressure downstream of valve 10.

Figure 6:
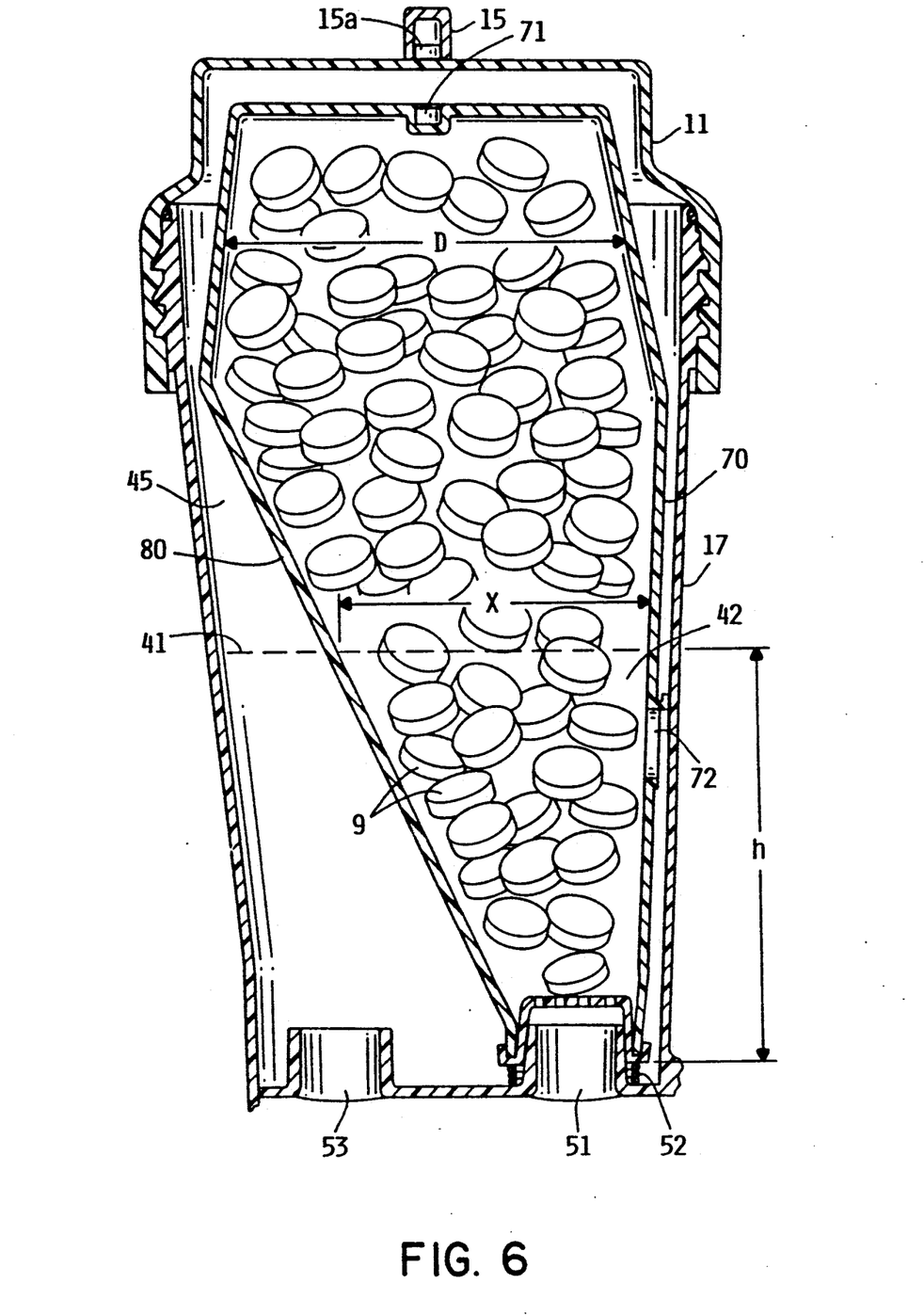
FIG. 6 is a partial cut-away view of an alternate embodiment inside a sectional cut-away dispersal valve.
Figure 11:
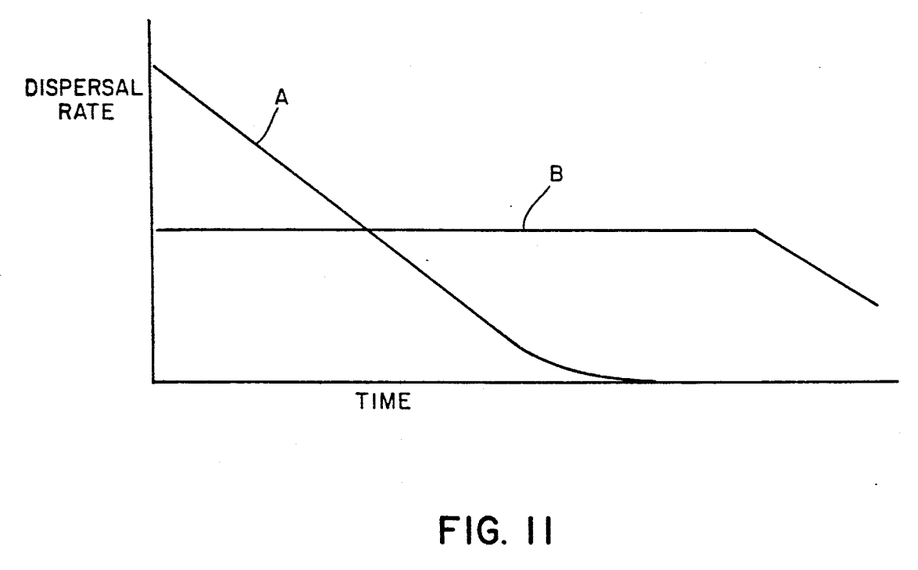
FIG. 11 is a graph showing dependent variable, dispersal rate, along the Y-axis versus the independent variable, time, along the X-axis.

FIG. 6 shows an alternate embodiment of a canister 70 located in a valve housing 17. Canister 70 includes a tapered neck 80 that limits the volume of tablets in contact with the liquid in the canister 70. Canister 70 has a top diameter D and a lower cross sectional dimension X located at the liquid level line 41. The purpose of having a smaller region at the bottom of a canister is to extend the lower range of dispersing rates of the dispersal valve. That is, a dispersal valve that is normally used to disperse material at a minimum rate through control of the size of the openings in the plug 14 can be adapted to provide even lower more controlled dispersant rates with the present invention. For example with control of only the rate of water flowing through the dispersal valve the minimum rate of dispersal is determined by the minimum rate of liquid that flows through the valve. To illustrate the effect of dispersant rate on time reference should be made to FIG. 11 which shows the dispersal rate as a function of time. Curve A denotes the dispersal rate with a prior art dispersal valve where the all the dispersant tablets remained in contact with the liquid. Curve B illustrates the rate of dispersal with the present invention using a canister where a portion of the tablets are stored in the canister above the liquid. By having a smaller portion of the dispersant tablets in contact with the liquid, and more fresh tablets located above the liquid to fall into the lower portion of the canister extends the time t where the dispersal rate remains relatively constant. Thus a feature of the present invention is not only the ability to scale down the rate of dispersant but also provide for a more uniform dispersion rate of material into the liquid. With the present invention one can conventionally disperse dispersant at high rates or the dispersant rate can be quickly changed to disperse small amounts of dispersant by merely changing the size of the canister in the dispersal valve. That is, with the same volume flow of liquid through chamber 45 canister 70 disperses dispersant at a slower rate than the canister 30 which has a wider lower section that permits more dispersant tablets to be in contact with the water for the same water level h.

Canister 70 includes a top having a magnet 71 embedded within the central top region of canister 70. The axis of magnet 71 is located so that one pole of magnet 71 faces upward and the opposite pole of magnet 71 faces downward. Magnet 71 is shown as a permanent part of canister 71. Located in the cover 11 is a visual indicating member comprising a transparent sight member 15 that contains a second magnet 15a. Magnet 15a is positioned with its poles so that the two magnets repel each other when magnet 71 is brought close to magnet 15a. Consequently, if the magnets 71 and 15a repel one another as canister 70 rises because the dispersant has dissolved it forces magnet 15a upward in sight member 15 thereby visually alerting a user that it is time to replace canister 70.

Figure 7:
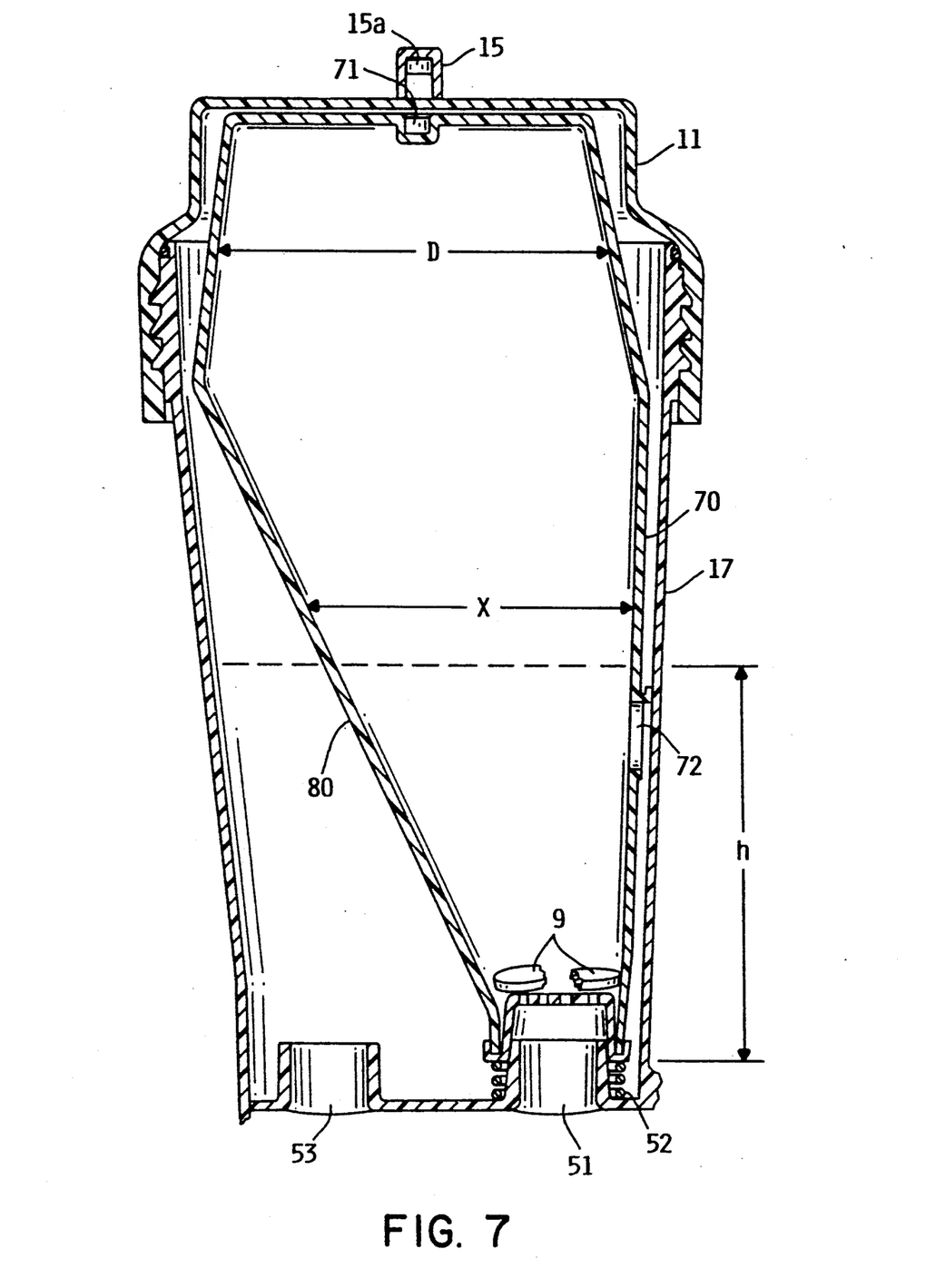
FIG. 7 is a partial cut-away view of the emptied canister and the dispersal valve.

FIG. 7 illustrates canister 70 in a nearly empty condition with substantially all of tablets 9 dissolved. In this condition canister 70 is forced upward by the combination of the buoyant forces and spring 52. Note, the magnet 15a is positioned at the top of the sight member thereby providing a visual indicating means to alert a user to the fact that canister 17 needs replacement.

Figure 8:
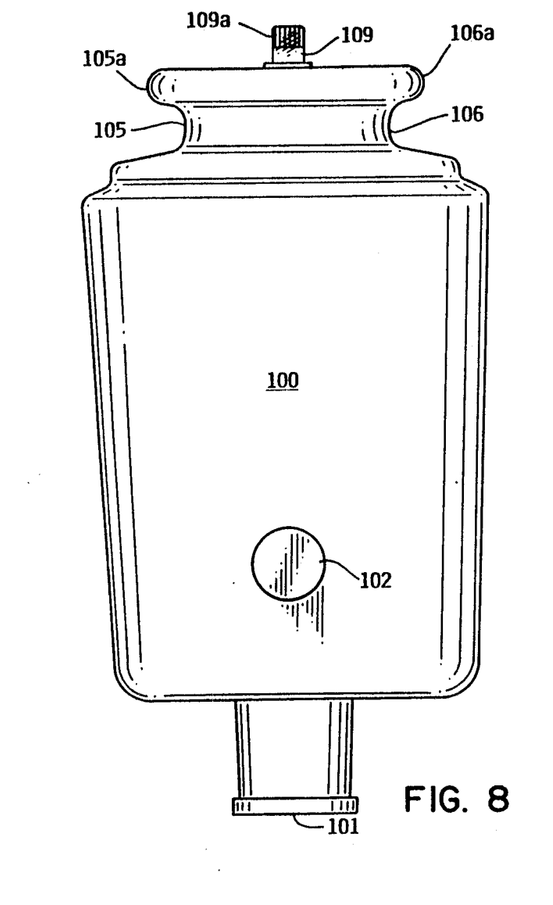
FIG. 8 is a front view of a further alternate embodiment of a canister.

FIG. 8 shows a further variation of the visual indicating means wherein a canister 100 includes a sight post 109 mounted in a protruding manner at the top of canister 100. Located on the top end of canister 100 are a pair of recesses 105 and 106 with a corresponding hand gripping areas 105a and 106a that permit a user to grasp canister 100 from the top and lift the empty canister from the dispersal valve.

Figure 9:
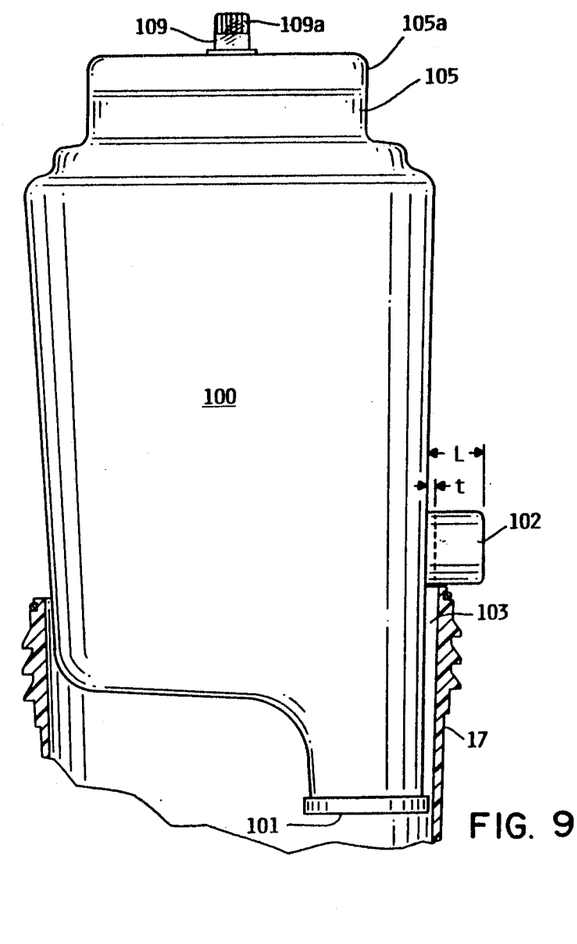
FIG. 9 is a partial side view of the canister of FIG. 8.

In addition to the hand grips canister 100 includes an outward extending fluid outlet member 102 that has a cylindrical break line 103 where the the outlet member 102 must be cut off if one wants to insert canister 100 into housing 17. That is, as FIG. 9 shows if one attempts to insert canister 100 into housing 17 the canister will not fit. Consequently, one is prevented from inserting the canister into the container unless one is familiar with handling of the dispersant canisters.

Figure 10:
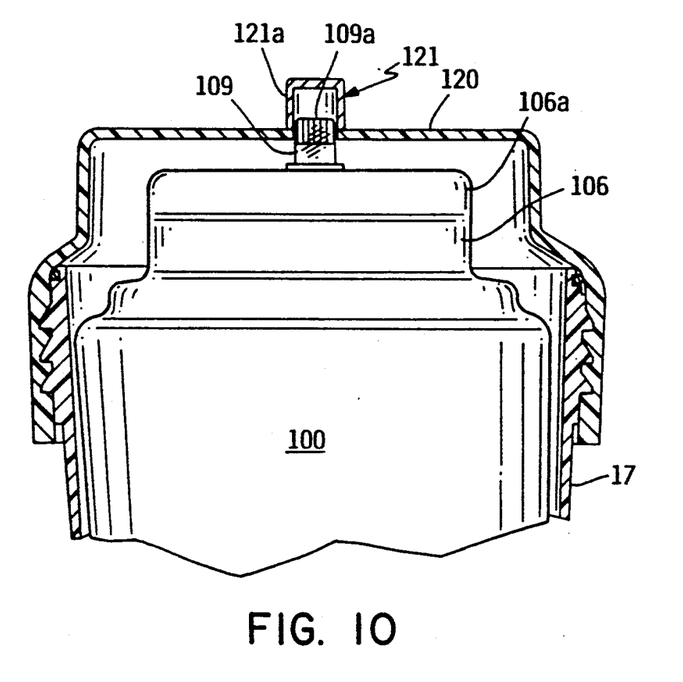
FIG. 10 is a partial side view of the top of the canister of FIG. 8 and the top of the dispersal valve.

FIG. 10 illustrates how the canister 100 provides a visual indication of the amount of dispersant tablets in the canister. Canister 100 includes the post 109 with a colored region 109a that projects partial up into the transparent sight cup located on the top of cover 120. With the transparent sight cover located on the top of canister 100 it is apparent that upward displacement of the canister 100 produces a visual indication of the movement of the canister in housing 17 and consequently of the amount of dispersant remaining in the canister. In an alternate embodiment the entire cover 11 can be made from a transparent material with markings on the interior of cover 11. Consequently, upward displacement of canister 100 could be determined by merely observing the vertical position of the canister with regard to the interior markings on cover 11. Also if the canister were made of clear material the user could visually observe the amount of remaining dispersant.

Figure 12:
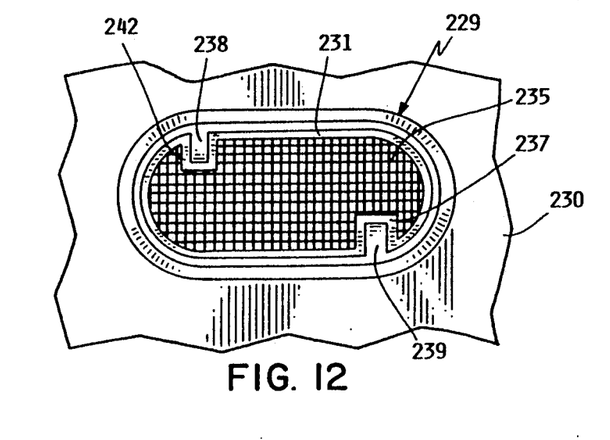
FIG. 12 is a top view of an end spout for a canister.

FIG. 12 shows a top view of a canister 230 having a keyed inlet spout 229 for engaging a port in the dispersal valve. Spout 229 has a lip 231 and a tapered neck 232 that fits into a mating opening in the fluid port on the dispersal valve. Located inside spout 229 is a screen 235 that has sufficiently small openings so as to prevent granules from falling into the fluid port on the dispersal valve. In order to prevent the canister with the spout from being improperly inserted into a dispersal valve the the spout include an extension 242 having an opening 238 for engaging a stud (not shown) in a dispersal valve. Similar located on the other side of the spout is an extension member 237 having a rectangular opening 239 for engaging a rectangular shaped stud (not shown) on a dispersal valve. The combination of keyed opening on the spout for the canister and a stud like key in the dispensing valve prevents one from inserting a cannister into the wrong dispersal valve.

Figure 13:
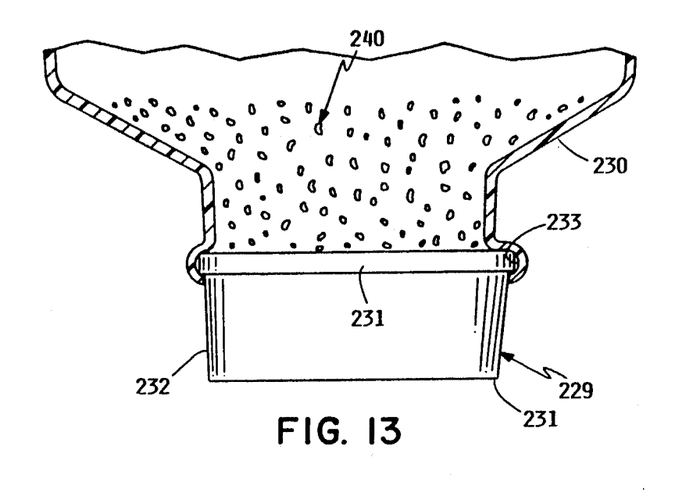
FIG. 13 shows a partial cutaway view of a side elevation of a canister containing a granular dispersant.
Figure 14:
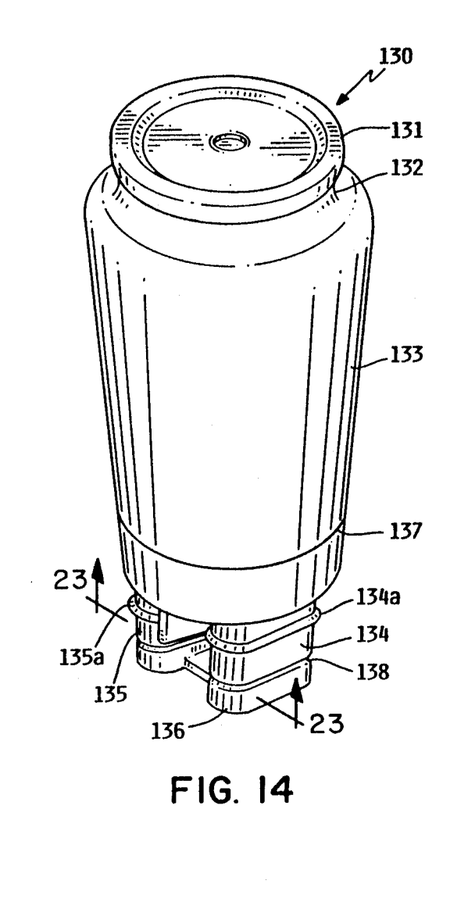
FIG. 14 shows a pictorial view of an alternate embodiment of a canister.
Figures 15, 16, 23:
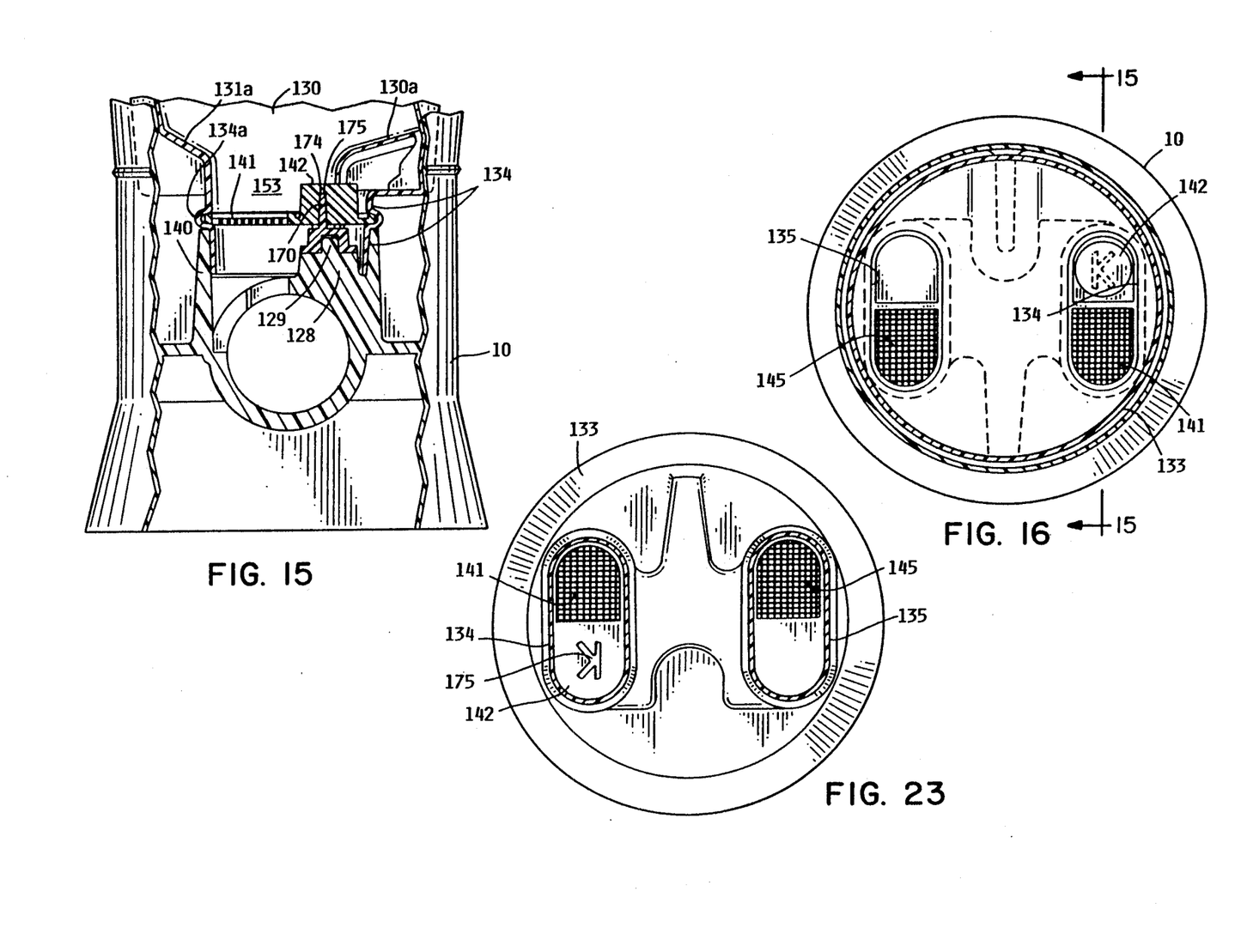
FIG. 15 shows a partial cross sectional view of the canister of FIG. 14 and a dispersal valve.
FIG. 16 shows a cross sectional view without the dispersant material in the canister taking along lines 16—16 of FIG. 17.
FIG. 23 shows a bottom view of the canister of FIG. 14.

FIG. 13 shows a partial cross sectional view of a canister and a spout 229. Located in container 230 is a granular dispersant 240. The purpose of using a granular dispersant is to enable one to more effectively disperse the dispersant into the liquid as it flows through canister 230.

FIG. 14 shows an alternate embodiment of a canister 130 having a handgrip ridge 131 with a finger recess 132 to permit a user to lift canister 130 out of a dispersal valve. Canister 130 comprises a housing having an upper region 133 and a lower region having a first fluid port 134 and a second fluid port 135. A cap 136 extends over ports 134 and 135 to seal the canister during storage. A break line 138 extends around each of the ports to permit cap 136 to be quickly separated from canister when the canister is in use. A mating line 137 identifies where the top half and the lower half of canister have been joined together to form a closed canister.

FIG. 15 shows a partial sectional view of canister 130 mounted in dispersal valve 10. FIG. 15 illustrates the fluid tight sealing relationship of port 134 with an elongated mating extension port 140 located in the bottom of valve 10 through the use of closely mating tapered male and female members. Similarly, the port on the opposite of canister 130 forms a fluid tight sealing relationship with the second mating extension located in the bottom of valve 10. The sealing relationship of the ports and extensions can be better seen in FIG. 17. The purpose of having the ports and extensions forming sealing relationships is that the fluid flowing through my valve must pass through the canister rather than around it and thus avoid contact with the dispersant. Canister 130 also includes an elongated cap 142 having a screen 141 on one end and a keyed recess 175 on the other end for matingly engaging a key post 170 in valve 10. The key post 170 can be better seen in FIGS. 20–22 and comprises a circular base 172 having a circular extension 171 with a male extension 174 comprising the letter K extending upward from base 171 to from a male member for fitting into a female recess. FIG. 23 shows the female recess 175 for engaging the male extensions 174 shown in FIG. 20. A feature of the invention is that the user can make a single all purpose dispersal valves 10 unique to the chemical used in the dispersal valve. That is, by merely sonic welding keypost 170 with a unique key onto an extension on the inside of valve 10 one makes an all purpose dispersal valve receptive to only the type of canister having a mating recess for the key on the keypost. FIG. 15 and 22 show a cylindrical post 129 extending upward from keypost base 128 in valve 10. The recess 173 (FIG. 21) in the bottom of keypost 170 forms a mating opening with surface 129*s* on post 129. The surface 173*b* forms a mating surface with valve surface 106 to permit a manufacturer to instal keypost 170 in a valve through sonic welding or the like. The advantage of having a keypost that is installed after the valve is made is that the manufacture can key the valve for the proper canister so only the proper canister is used in the dispersal valve. For example, if one dispersal valve is to be used in a chlorine system that uses only a chlorine canister and another dispersal valve is to be used in a bromine system that uses only a bromine canister the two dispersal valve can be keyed with different keyposts to prevent a user from accidently inserting the bromine canister into the dispersal valve that dispenses chlorine or vice versa.

One of the features of my invention is that my canister allows one to controllable dispense material into a fluid at a substantially constant rate over an extended period of time through the use of an air pocket that limits the amount of fluid in contact with the dispensing material. Another feature of my invention is that I can control where the liquid flows through the dispersant as well as the amount of dispersant in contact with the liquid flowing through my valve. Still another feature of my invention is that I can dispense material from the granular state without having to tabletize the material. Heretofore the material has been tabletized before use in dispersal valves. Typically, bromine dispersant is formed into a powder. The powder is then formed into granules referred to as granular material. The granular material may have 9% of the particles with a diameter of less than 0.020 inches with about 91% of the particles having a diameter over 0.020 inches and generally not greater than about 0.040 inches in diameter. The material in the granular state has been unsuitable for use in canister in dispersal valves since it has been difficult to control the dispersal rate of the granular material into the liquid. Consequently, the granular dispensing material such as chlorine or bromine has been formed into cylindrical tablets that may have a diameter of 1 to 3 inches. These tablets have then been inserted into the canister of the dispersal valve to controllable dispense the material into the liquid in the dispersal valve. The present invention provides a canister that can both hold and controllable disperse a dispersant into a liquid while the dispersant is in a granular state.

In order to appreciate the operation of my invention reference should be made to FIG. 18 which shows a portion of the lower region of canister 130 without any dispensing material therein. The lower region of canister 130 includes an elongated trough 153 having sides 131a and 130a that funnel material downward into trough 153 under the force of gravity. Canister 130 differs from the other canisters shown in the drawings in that the inlet and the outlet passage for canister 130 are located in the same horizontal plane and at the bottom of though 153. Port 134 includes an internal passage 151 for directing liquid inward into a first bottom end of trough 153 and port 135 includes and outlet passage 152 for directing liquid through the opposite bottom end of trough 153. In operation of canister 130 the liquid is directed into trough 153 and flows along the bottom of trough 153 until it discharges through passage 152. The air pocket located above trough 153 prevents the liquid from rising in canister 130 and causes the liquid to reach a maximum level indicated by liquid line 155. That is, the level of liquid in trough 153 remains relatively low and is confined to the trough area. For example, the trough volume 153 may be only 5% of the total volume of the canister. Consequently, only a very small portion of the dispensing material will remain in contact with the liquid flowing through trough 153. Thus with the present invention one can place a canister containing a dispersant into a dispersal valve that normally may fill with the liquid without having the entire contents of the canister filled with a liquid.

Figure 17:
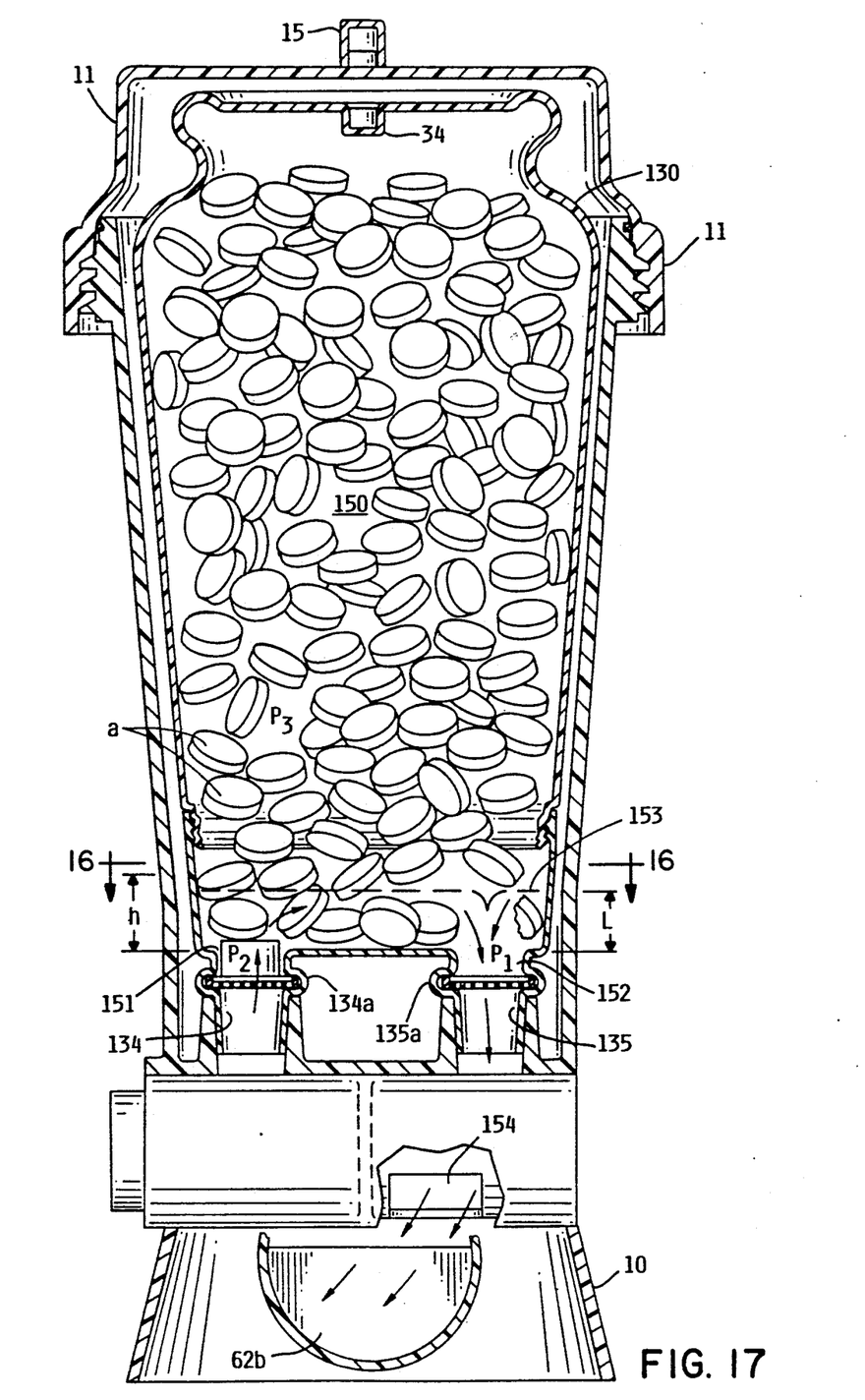
FIG. 17 shows a cross sectional view of the canister of FIG. 14 and a dispersal valve.
Figure 18:
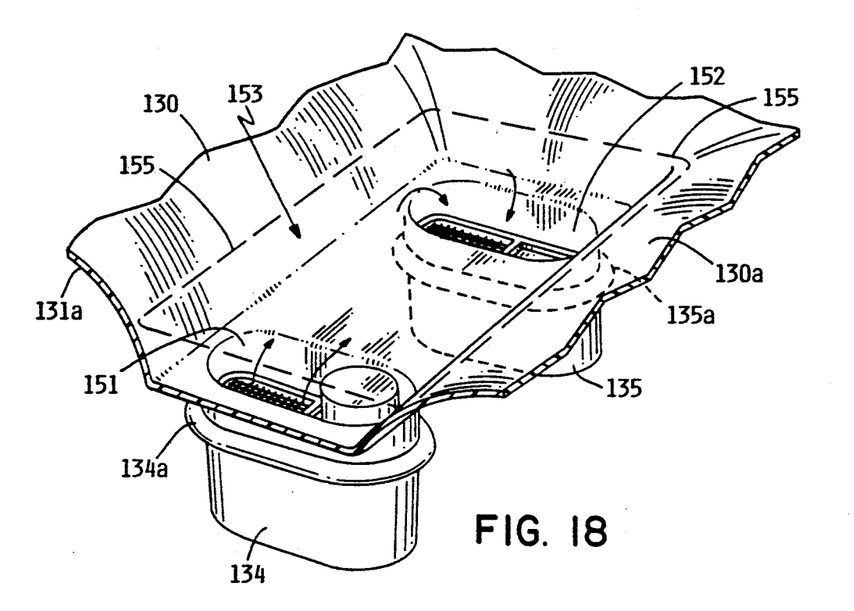
FIG. 18 shows a partial cross section view of the trough located in the canister of FIG. 15.

FIG. 17 illustrates valve 10 and canister 130 in cross section with tablets 9 located in trough 153. The height of trough 153 is indicated by h and the liquid level in trough 153 is indicated by L. $P_2$ indicates he pressure at the inlet passage 151, $P_1$ indicates the pressure at the outlet 152 and $P_3$ indicates the pressure in the air pocket 150. In the embodiment shown the tablets in air pocket $P_3$ remain free of contact with liquid and remain in an undispensed state. However, the tablets 9 located in trough 153 are in contact with the liquid resulting in dispensing of dissolvable or erodible tablets directly into the liquid in proportion to the rate of liquid flowing past the tablets and the amount of tablets in contact with the surface of the tablets. Consequently, the use of a dispersal valve that directs only a portion of the fluid through the trough permits a user to controllable dispense the dispersant in the trough at a substantially constant rate over an extended period of time. In addition the use of a canister that continually funnels unspent dispersant into the trough permits one to controllable dispense material at a substantially constant rate for two weeks or longer.

Figure 19:
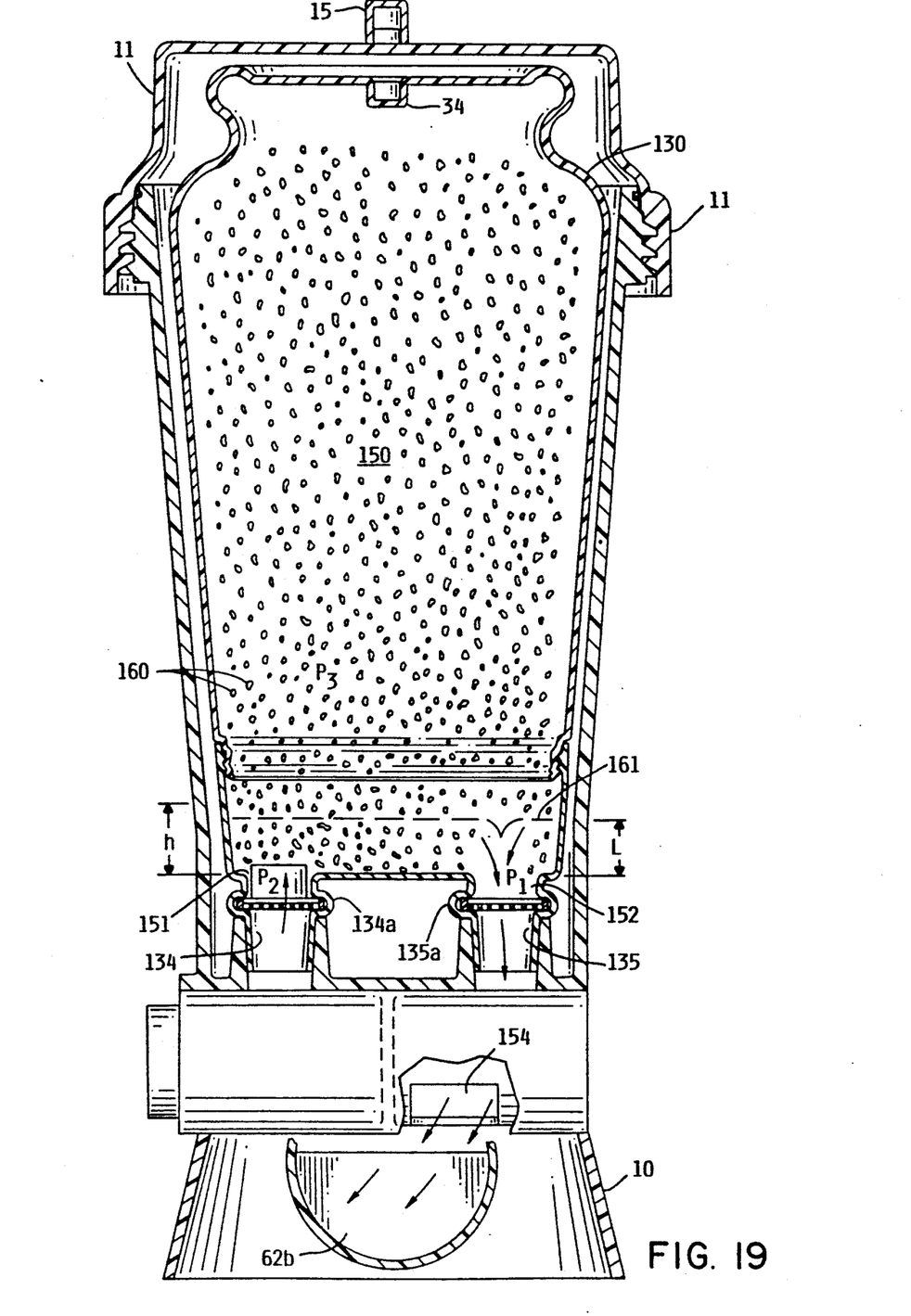
FIG. 19 shows a cross sectional view of the canister of FIG. 14 and a dispersal valve with the canister containing granular material.
Figure 20:
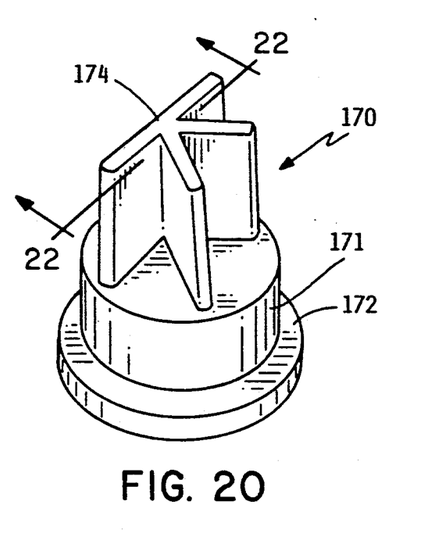
FIG. 20 shows a pictorial view of the keypost used in the dispersal valve.
Figure 21:
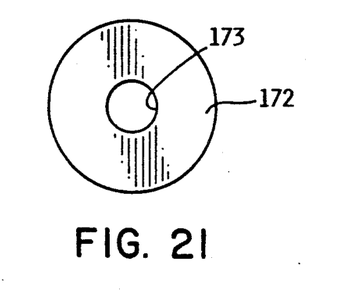
FIG. 21 shows a bottom view of the keypost of FIG. 20.
Figure 22:
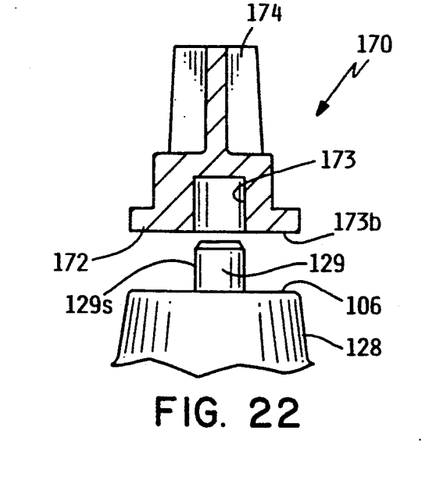
FIG. 22 shows a sectional view of the keypost of FIG. 20.

FIG. 19 shows an alternate embodiment of a canister that is identical to the canister in FIG. 17 except that canister 130 contains a granular material 160 rather than a tabletized or solid material. Prior to my canister bromine and chlorine which was in granular form needed to be tabletized in order to be used in dispersal valves. The present invention permits one to use granular material in the canister thus eliminating the step of having to tabletize the material before dispensing. Because the present invention limits the liquid contacting the dispensing material and allows fresh dispensing material to fall into a dispensing trough as the dispensing material is removed from the dispensing trough one can obtain both limited and uniform dispersion rates of the dispensing material over an extended period of time. In addition the control of the size of the dispensing trough permits one to control the amount of liquid in contact with the dispensing material. The use of an upper region that funnels materials from the upper region to the lower region containing the dispensing trough permits one to continually replenish spent dispensing material.

Although not shown a spring support for canister 130, similar to canister spring support 52, can be used to have canister 130 provide a visual indication of the amount of unspent dispersant material remaining in the canister. However, in such an arrangement a different sealing relationship between the extension and port would be required to ensure that the fluid is directed through valve 10 as the canister moves up in response to the removal of dispersant.

When my invention includes a pocket with a compressible gas such as air located therein I provide an automatic method for forcing the liquid away from the dispersant to stop the liberation of dispersant when the line pressure to the valve is shut down. That is, under normally operating pressure in the valve the air in the air pocket compresses to a smaller volume to permit liquid to flow through the valve and the dispersant in the canister. When the liquid pressure to the line is shutoff the liquid pressure deceases and the air pressure of the compressed air forces the compressed air to expand to its original volume and thus force the liquid in the canister back into the liquid line and out of the canister thus preventing further liberation of dispersant by any residual liquid remaining in contact with the dispersant in the canister.

A still further feature of my invention is my canister provides an effective means for holding and safely disposing of substantially all toxic or noxious dispersant gas remaining in the valve. In prior art systems when the dispersant was used up one would remove the cover of the valve and place a new dispersant tablet into the valve. A drawback was that the valve may contain residual gas from the dispersant even though the dispersant had been used up. For example, if the valve contained chlorine gas once the cover of the valve was removed the chlorine gas could escape and be inhaled by the person attempting to refill the valve. In the present embodiment most of the gas from the dispersant remains in the canister and can be removed with the canister. Once the cover is removed from the valve only a small amount of gas between the outside of the canister and the interior of the valve housing can escape. By removing the canister and covering the ports one can take the canister with any noxious gas to a disposal area where the canister and the gas can be disposed of without injuring humans. Consequently, my invention makes it safer to replace the dispersant by permiting the user to remove the canister and substantially all the noxious gases without letting the noxious gases escape into the immediate users environment around the valve.

I claim:
1. A canister for insertion into a dispersal valve to permit a user to determine the amount of dispersant left in the canister without having to open the dispersal valve comprising:
   a canister housing having a top end and a bottom end, said canister housing having a compartment for entrapping air;
   a dispersant and air located in said canister housing, said dispersant to be dispersed into a liquid, said air in said compartment providing a buoyant force to said canister housing when said canister housing is located in a liquid and said dispersant providing a non-buoyant force to said canister housing to thereby cause said canister to sink when said canister housing is located in a liquid;

an inlet located in said canister housing to permit the liquid to enter said canister housing, said inlet including a member for engaging a portion of a dispersal valve to support said canister housing in a dispersal valve;

an outlet located in said canister housing to permit the liquid to flow through said inlet and around said dispersant to thereby transfer dispersant into the liquid so that the liquid with the dispersant is directed into said outlet and into a region for receiving the liquid with said dispersant; and a visual indicator connected to said canister housing, said visual indicator having means for providing a visual indication to an observer that said canister housing is displaced relative to a dispersal valve to thereby alert a user that the dispersant has been depleted and that the canister should be replaced.

2. The invention of claim 1 wherein said visual indicator comprises a first magnet having a north pole and a south pole, said first magnet located in the top end of said canister housing to permit said first magnet to interact with a second magnet in a dispersal valve to thereby provide a visual indication that the canister needs replacing.

3. The invention of claim 1 wherein said canister includes a projection extending outward from said canister housing, said projection extending sufficiently far outward from said canister housing to prevent a user from inserting said canister housing into a dispersal valve unless a portion of said projection is removed from said canister housing.

4. A canister for insertion into a dispersal valve to permit a user to determine the amount of dispersant left in the canister without having to open the dispersal valve comprising:

a canister housing having a top end and a bottom end, said canister housing having a compartment for entrapping air;

a dispersant and air located in said canister housing, said dispersant to be dispersed into a liquid, said air in said compartment providing a buoyant force to said canister housing when said canister is located in a liquid and said dispersant providing a non-buoyant force to said canister housing to thereby cause said canister housing to sink when said canister housing is located in a liquid;

an inlet located in said canister housing to permit the liquid to enter said canister housing;

an outlet located in said canister housing to permit the liquid to flow through said inlet and around said dispersant to thereby transfer dispersant into the liquid so that the liquid with the dispersant is directed into said outlet and into a region for receiving the liquid with said dispersant; and a visual indicator connected to said canister housing, said visual indicator comprising a member projecting upward from the top of said canister housing to permit said member to be visible through a sight member on the top of a dispersal valve when the canister is empty and to be hidden from view through a sight member on the top of a dispersal member when the canister is filled with a dispersant.

5. The canister of claim 1 wherein said canister housing has a tapered bottom end to limit the amount of dispersant that can be located in said bottom end of said canister housing so that the amount of liquid in contact with the dispersant can be limited to control the rate of dispersant.

6. A dispersal valve and a canister for insertion into the dispersal valve comprising:

a dispersal valve housing having a fluid inlet and a fluid outlet for directing fluid to a downstream container, a chamber located in said dispersal valve housing;

a removable canister located in said chamber of said dispersal valve housing, said removable canister having a fluid inlet port and a fluid outlet port, said removable canister having a compartment for containing a dispersant, a liquid and a pocket of air, said pocket of air limiting the amount of dispersant in contact with the liquid in said removable canister;

a first diverter member located in said dispersal valve housing for directing fluid from said fluid inlet into said chamber;

a second diverter member located in said dispersal valve housing for directing fluid from said chamber into said fluid outlet;

a fluid obstruction located in said dispersal valve housing to increase the velocity of the fluid as it passes by said obstruction to thereby produce a lower pressure proximate said fluid outlet to thereby minimize the pressure effects in the downstream container on the volume of the air in the compartment in said removable canister; and resilient means located in said dispersal valve housing to provide an upward force to said removable canister to thereby assist said removable canister in being displaceable upward in response to the dissipation of the dispersant in said removable canister.

7. A dispersal valve for metering the amount of material that is dispersed into a fluid stream comprising:

a housing having a chamber for holding material to be dispersed into a fluid stream, said chamber having a region for insertion of a canister therein, a closure on said housing to permit insertion of a canister in said chamber;

a rotatable plug located in said housing, said rotatable plug having openings therein to permit the user to control the rate of liquid flowing into said chamber with the improvement comprising:

a member located in said chamber and extending outward from said housing to slidingly engage a canister when a canister is positioned in said chamber; and a resilient member located in said chamber, said resilient member operable to provide a vertically upward force to a canister located in said chamber so that the vertical displacement of the canister located in the chamber can be used to provide a visual indication as to when the canister should be replaced.

8. The invention of claim 7 wherein said member comprises a fluid inlet port for directing fluid from said dispersal valve into a canister; and the canister located in said chamber is removable, said removable canister including means to provide a visual indication on whether the removable canister contains a dispersant.

9. The invention of claim 8 wherein said removable canister has a tapered neck to limit the amount of dispersant in contact with a liquid in said removable canister.

10. The invention of claim 8 wherein said removable canister includes a handle to facilitate removal of said removable canister from said dispersal valve.

11. The invention of claim 8 wherein said removable canister includes a post located on the top of said removable canister and said housing includes a sight member for said post to move up and down in response to the amount of dispersant in said removable canister.

12. The canister of claim 1 wherein the dispersant in said canister housing includes granular dispersant for treating a liquid.

13. The canister of claim 12 wherein said canister housing includes an opening for mating with an extension located in the fluid port of a dispersal valve.

14. A canister for controllable dispensing a dispersant into a fluid comprising:

a housing, said housing having an upper region and a lower region for holding a dispersant;

a first fluid port connected to said lower region of said housing to permit fluid to pass therethrough;

a second fluid port connected to said lower region of said housing to permit fluid to pass therethrough;

a trough located in said lower region of said housing, said trough having a bottom, said trough holding a portion of said dispersant in a position whereby the dispensing of the dispersant in said trough causes the dispersant in said upper region to fall into said trough to replace the dispersant removed from said trough, said first fluid port located in fluid communication with a portion of said trough and said second fluid port located in fluid communication with a further portion of said trough so that fluid can flow from said first fluid port through a portion of the dispersant located in said trough and into said second fluid port along said trough to thereby carry a portion of said dispersant into the fluid.

15. The canister of claim 14 wherein said upper region comprises a closed compartment to provide an air pocket in said upper region of said canister.

16. The canister of claim 14 wherein said dispersant comprises a granular material and said trough is an elongated channel for holding a small portion of the granular material in contact with a fluid to permit the granular material to be controllably dispensed into a fluid.

17. The canister of claim 14 wherein said first port includes a screen to hold the dispersant in said canister with said screen having openings to permit flow of fluid therethrough.

18. The canister of claim 14 including a keyed section for engaging a mating keyed section in a dispersal member.

19. The canister of claim 14 wherein said fluid ports are located underneath said trough to direct a liquid through the bottom of said trough and to remove liquid through the bottom of said trough.

20. A canister for mounting in a dispersal valve to controllably dispense a dispensable material into a fluid at a substantially constant rate over an extended period of time comprising:

a housing, said housing having an upper region and a lower region for holding a dispensable material, said housing upper region connected to said lower region to permit dispensable material in said upper region to fall into said lower region as the dispensable material is removed from said lower region, said upper region including an air pocket to prevent fluid from coming into contact with said dispensable material in said upper region;

fluid means connected to said lower region of said housing to permit fluid to pass through only a portion of the dispensable material located in said lower region of said housing, said lower region of said housing including a trough for holding the dispensable material in a position to be dispensed, said upper region having a first volume and said trough having a second volume with said second volume of said trough being substantially less than said first volume of said upper region to thereby permit continual replenishment of the dispensable material in said trough as the fluid in said trough disperses said dispensable material into the fluid whereby the dissolution of the dispensable material in said lower region causes the dispensable material in said upper region to fall into said lower region to replace the dispensable material removed from said lower region to thereby maintain substantially a constant amount of dispensable material in contact with the fluid in said lower region to permit the fluid flowing through said lower region to dispense said dispensable material at a substantial constant rate into the fluid flowing through said lower region.

21. The canister of claim 20 wherein the volume of said trough is less than 10% of the volume of said upper region.

22. The canister of claim 20 wherein said dispensable material comprises granular bromine.

23. The canister of claim 1 wherein said canister includes a spout for engaging a fluid port in a dispersal valve.

* * * * *